United States Patent
Polechtchouk et al.

(10) Patent No.: US 9,767,519 B2
(45) Date of Patent: Sep. 19, 2017

(54) METHOD FOR PROCESSING TRANSACTIONAL DATA, CORRESPONDING TERMINAL, SERVER AND COMPUTER PROGRAM

(71) Applicant: Compagnie Industrielle et Financiere D'Ingenierie "Ingenico", Paris (FR)

(72) Inventors: Pavel Polechtchouk, Mosman (AU); David Naccache, Paris (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 14/562,245

(22) Filed: Dec. 5, 2014

(65) Prior Publication Data
US 2015/0161744 A1    Jun. 11, 2015

(30) Foreign Application Priority Data
Dec. 5, 2013 (FR) .................................. 13 62191

(51) Int. Cl.
 G06Q 30/00    (2012.01)
 G06Q 40/00    (2012.01)
 G06Q 40/02    (2012.01)

(52) U.S. Cl.
 CPC ............. *G06Q 40/12* (2013.12); *G06Q 40/02* (2013.01)

(58) Field of Classification Search
 CPC .............................. G06Q 40/00; G06Q 30/00
 USPC ................... 705/30, 14.53, 44, 28
 See application file for complete search history.

(56) References Cited

U.S. PATENT DOCUMENTS

| | | | | |
|---|---|---|---|---|
| 6,029,154 A | * | 2/2000 | Pettitt | G06Q 20/027 705/38 |
| 6,363,363 B1 | * | 3/2002 | Haller | G06Q 20/00 705/40 |
| 7,096,192 B1 | * | 8/2006 | Pettitt | G06Q 20/10 701/1 |
| 2001/0044787 A1 | * | 11/2001 | Shwartz | G06Q 20/00 705/78 |
| 2002/0091646 A1 | * | 7/2002 | Lake | G06Q 20/04 705/67 |
| 2002/0178071 A1 | * | 11/2002 | Walker | G06Q 20/00 705/26.41 |

(Continued)

FOREIGN PATENT DOCUMENTS

WO    2009055785 A2    4/2009

OTHER PUBLICATIONS

French Search Report dated Jun. 2, 2014 for corresponding French Patent Application No. 1362191, filed Dec. 5, 2013.

(Continued)

*Primary Examiner* — Seye Iwarere
(74) *Attorney, Agent, or Firm* — David D. Brush; Westman, Champlin & Koehler, P.A.

(57) ABSTRACT

A system is provided for processing data for surveillance bank cards. The system includes a module for introducing data for surveillance bank cards into a platform for payment by bank card, the module saving bank-card data, inserted into the platform for payment by bank card, to a data base known as a tracking data base. The system also includes a surveillance module for placing under surveillance the activity of the data for surveillance bank cards previously introduced into the platform for payment by bank card, the module saving, to the tracking data base, at least one record of tracking of the use of the bank-card data.

10 Claims, 2 Drawing Sheets

(56) References Cited

U.S. PATENT DOCUMENTS

Figure 1:
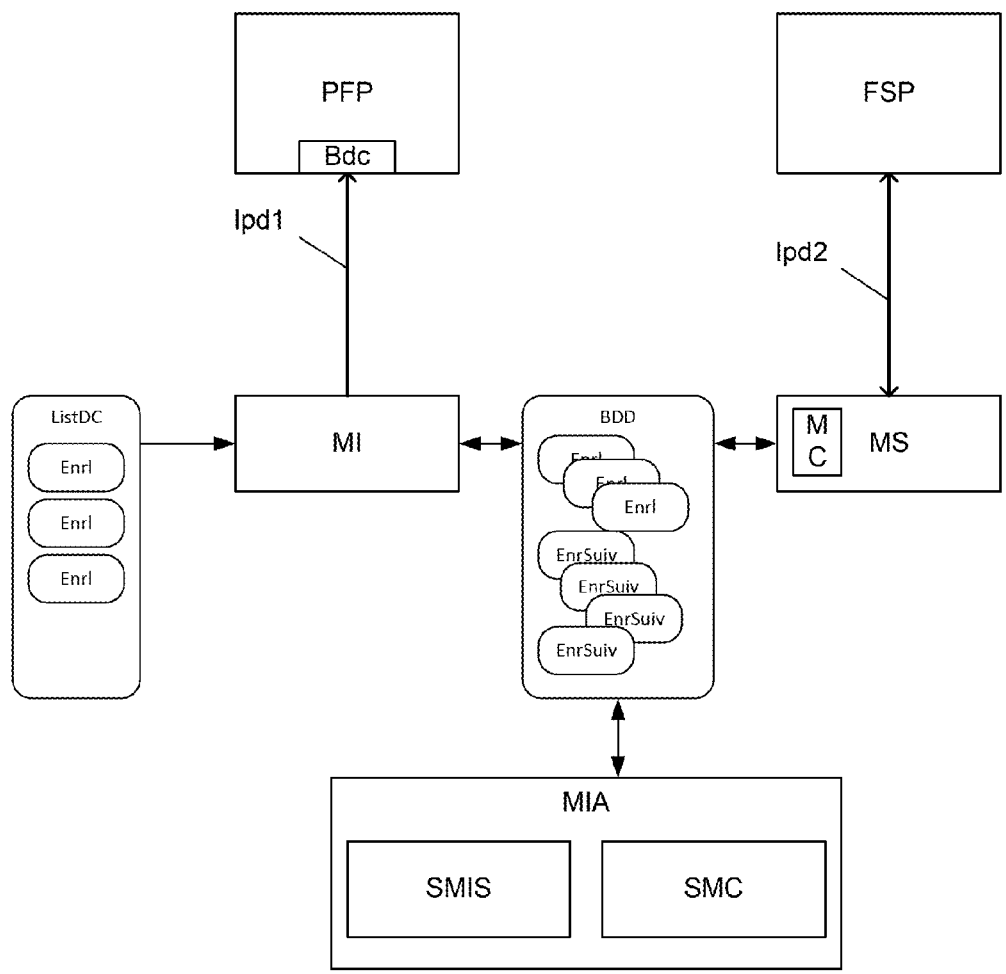

| Publication No. | Date | Inventor | Classification |
|---|---|---|---|
| 2003/0009426 A1* | 1/2003 | Ruiz-Sanchez | G06Q 20/04 705/78 |
| 2003/0233278 A1* | 12/2003 | Marshall | G06Q 30/00 705/14.35 |
| 2004/0039686 A1* | 2/2004 | Klebanoff | G06Q 20/10 705/38 |
| 2004/0243478 A1* | 12/2004 | Walker | G06Q 10/087 705/26.1 |
| 2005/0246292 A1* | 11/2005 | Sarcanin | G06Q 20/02 705/67 |
| 2006/0080230 A1* | 4/2006 | Freiberg | G06Q 20/00 705/39 |
| 2006/0236395 A1* | 10/2006 | Barker | G06F 21/552 726/23 |
| 2006/0237531 A1* | 10/2006 | Heffez | G06Q 20/32 235/382 |
| 2007/0250441 A1* | 10/2007 | Paulsen | G06Q 20/02 705/39 |
| 2007/0288394 A1* | 12/2007 | Carrott | G06F 21/10 705/78 |
| 2008/0040275 A1* | 2/2008 | Paulsen | G06Q 20/40 705/44 |
| 2008/0288405 A1* | 11/2008 | John | G06Q 20/40 705/44 |
| 2008/0319914 A1* | 12/2008 | Carrott | G06Q 20/02 705/75 |
| 2009/0102712 A1* | 4/2009 | Heffez | G06Q 20/32 342/357.55 |
| 2009/0307028 A1* | 12/2009 | Eldon | G06Q 20/12 705/37 |
| 2010/0106611 A1* | 4/2010 | Paulsen | G06Q 20/10 705/26.1 |
| 2010/0327056 A1* | 12/2010 | Yoshikawa | G06Q 20/40 235/380 |
| 2011/0125638 A1* | 5/2011 | Davis | G06Q 20/02 705/41 |
| 2011/0246372 A1* | 10/2011 | Zloth | G06Q 20/20 705/75 |
| 2011/0270752 A1* | 11/2011 | Neto | G06Q 20/40 705/44 |
| 2012/0101930 A1* | 4/2012 | Li | G06Q 40/02 705/35 |
| 2012/0101938 A1* | 4/2012 | Kasower | G06Q 20/12 705/39 |
| 2012/0130853 A1* | 5/2012 | Petri | G06Q 30/0609 705/26.35 |
| 2012/0136704 A1* | 5/2012 | Carlson | G06Q 30/02 705/14.17 |
| 2012/0158590 A1* | 6/2012 | Salonen | G06Q 10/02 705/44 |
| 2012/0173570 A1* | 7/2012 | Golden | G06Q 40/00 707/769 |
| 2012/0203632 A1* | 8/2012 | Blum | G06Q 30/0255 705/14.53 |
| 2013/0117186 A1* | 5/2013 | Weinstein | G06Q 20/12 705/67 |
| 2013/0332344 A1* | 12/2013 | Weber | G06Q 20/38 705/39 |
| 2014/0032410 A1* | 1/2014 | Georgiev | G06Q 20/405 705/44 |
| 2014/0137199 A1* | 5/2014 | Hefetz | G06Q 20/32 726/3 |
| 2014/0162598 A1* | 6/2014 | Villa-Real | H04M 1/66 455/411 |
| 2014/0330713 A1* | 11/2014 | Isaacson | G06Q 20/342 705/41 |
| 2014/0330729 A1* | 11/2014 | Colangelo | G06Q 20/4012 705/72 |
| 2015/0248664 A1* | 9/2015 | Makhdumi | G06Q 20/3274 235/380 |

OTHER PUBLICATIONS

Shujun Li et. al.: "A novel anti-phishing framework based on honeypots", ECRIME Researchers Summit, 2009. ECRIME '09, IEEE, Piscataway, NJ, USA, Sep. 20, 2009 (Sep. 20, 2009), pp. 1-13, XP031572065.

* cited by examiner

METHOD FOR PROCESSING TRANSACTIONAL DATA, CORRESPONDING TERMINAL, SERVER AND COMPUTER PROGRAM

1. FIELD OF THE INVENTION

The invention relates to the field of payment devices. More particularly, the invention relates to a method and a system for watching the use of payment devices or placing such use under surveillance.

2. PRIOR ART

In the past decade, e-commerce has experienced significant expansion. In particular, it is a powerful engine of growth in many industrialized countries. To make payment through e-commerce sites, customers are predominantly using credit cards. Although users are increasingly better informed on the security of e-commerce sites, especially when making payment, the amounts involved in bank card fraud every year are constantly increasing. In this bank card fraud, electronic fraud now amounts to more than three quarters of the total figure.

It has indeed become frequent to read press reports about theft from databases containing credit-card numbers and about the exposure of millions of credit-card numbers to fraudulent uses. Besides, there are Internet sites that are used as exchanges for the purchase and sale of stolen credit-card numbers.

At present, there are technical solutions to combat these data thefts. These solutions are generally based on the encryption of bank-card data in servers and on controls over access to this bank-card data. These solutions are different from the ones in which the transaction is encrypted at the time of payment. Indeed, although very many sites implement encryption solutions at the time of the transaction, the number of sites that protect data stored after the transaction has been made is relatively small.

Indeed, these solutions are costly and discourage certain commercial sites.

Thus, at the present time, a person who discovers that his or her credit card number has been misused can make a complaint and ask for the replacement of his credit card from the credit-card issuer. However, no solution is provided to the original problem. Thus, the card issuer cannot know when and where the bank-card data was misused. There are many solutions for tracking the use of credit cards. These solutions are generally intended for credit institutions and payment service providers. They work on the basis of bank authorizations which are required from the institution to validate a given transaction. More particularly, when a transaction exceeds a predetermined amount, an authorization is required from the credit institution in order to continue or not continue the transaction. It is therefore possible to detect the use of bank cards if the predetermined amount is exceeded. However, this solution is limited because it does not enable the detection of transactions whose amount is smaller than the authorized amount. This solution besides does not offer the possibility of detecting a source of fraud.

There is therefore a need to provide a solution to this problem in order to provide bank card issuers with the means to trace the source of thefts of bank-card data and combat the networks that distribute such data.

3. SUMMARY OF THE INVENTION

The proposed technique resolves at least a part of these problems. More particularly, the proposed technique pertains to a system for processing data for surveillance bank cards. Such a system comprises:
  a module for introducing data for surveillance bank cards into a platform for payment by bank card, said module saving bank-card data, inserted into said platform for payment by bank card, to a database known as a tracking database;
  a surveillance module for placing under surveillance the activity of the data for surveillance bank cards previously introduced into said platform for payment by bank card, said module saving, to said tracking database, at least one record of tracking of the use of bank-card data and delivering data on detection of a fraudulent use of said data for surveillance bank cards.

According to one particular embodiment, the module for introducing inputs a list of data for surveillance bank cards to be inserted, this list comprising records of data for surveillance bank cards, each record comprising at least one bank card number and a date of expiry in the year/month format.

According to one particular characteristic, each record further comprises a ceiling on the amount of a unit transaction and an overall ceiling.

According to one particular characteristic, said module for introducing comprises means of connection, by means of a pre-defined connection interface, to a bank-card database of said platform for payment by bank card.

According to one particular embodiment, said surveillance module comprises means of connection, by means of a pre-defined connection interface, to at least one transaction server of a payment service provider and means for controlling the use of bank-card data, by means of data obtained through these connection means.

According to one particular characteristic, said means for controlling comprise:
  means of comparison, with said data obtained by means of said at least one transaction server of a payment service provider, of a bank card number of said tracking database; and
  means for verifying an authorization of payment when the means of comparison provide a number recorded in said tracking database.

According to one particular characteristic, said means of verification further comprise means for obtaining at least one piece of complementary data associated with the use of said bank cards.

According to one particular embodiment, said piece of complementary data belongs to the group comprising:
  an IP address for sending a transaction relative to said bank data;
  a physical address corresponding to a place of use of said bank data.

The technique described also relates to a method for processing data for surveillance bank cards in a system as described here above. Such a method comprises:
  a step for introducing data for surveillance bank cards into a platform for payment by bank card, the step comprising the saving, to a database, called a tracking database, of the bank-card data inserted into said platform for payment by bank card;
  at least one step for tracking activity of the data for surveillance bank cards, introduced previously into said platform for payment by bank card, comprising the saving, to said tracking database, of at least one record of a tracking of the use of bank-card data.

According to a preferred implementation, the different steps of the methods according to the invention are implemented by one or more software programs or computer programs comprising software instructions intended for execution by a data processor of a relay module according to the invention and being designed to command the execution of the different steps of the method.

As a consequence, the invention also concerns a program that can be executed by a computer or by a data processor, this program comprising instructions to command the execution of the steps of a method as mentioned here above.

This program can use any programming language whatsoever and can be in the form of source code, object code or intermediate code between source code and object code such as in a partially compiled form, or in any other requisite form whatsoever.

The invention also relates to an information carrier readable by a data processor and comprising the instructions of a program as mentioned here above.

The information carrier can be any entity or device whatsoever capable of storing the program. For example, the carrier can comprise a storage means such as a ROM for example, a CD ROM or a microelectronic circuit ROM or again a magnetic recording means, for example a floppy disk or a hard disk drive.

Besides, the information carrier can be a transmissible carrier such as an electrical or optical signal which can be conveyed via an electrical or optical cable, radio or other means. The program according to the invention can in particular be uploaded to an Internet type network.

As an alternative, the information carrier can be an integrated circuit into which the program is incorporated, the circuit being adapted to executing or being used to execute the method in question.

According to one embodiment, the invention is implemented by means of software and/or hardware components. In this respect, the term "module" can correspond in this document equally well to a software component as to a hardware component or to a set of hardware and software components.

A software component corresponds to one or more computer programs, one or more sub-programs of a program or more generally to any element of a program or a software program capable of implementing a function or a set of functions according to what is described here below for the module concerned. Such a software component is executed by a data processor of a physical entity (terminal, server, gateway, router, etc) and is capable of accessing the hardware resources of this physical entity (memories, recording media, communications buses, input/output electronic boards, user interfaces, etc).

In the same way, a hardware component corresponds to any element of a hardware assembly capable of implementing a function or a set of functions according to what is described here below for the module concerned. It may be a programmable hardware component or a component with an integrated processor for the execution of the software, for example an integrated circuit, a smartcard, a memory card, an electronic card for executing firmware, etc.

Each component of the system described here above of course implements its own software modules.

The different embodiments mentioned here above can be combined with one another to implement the invention.

4. LIST OF FIGURES

Figure 2:
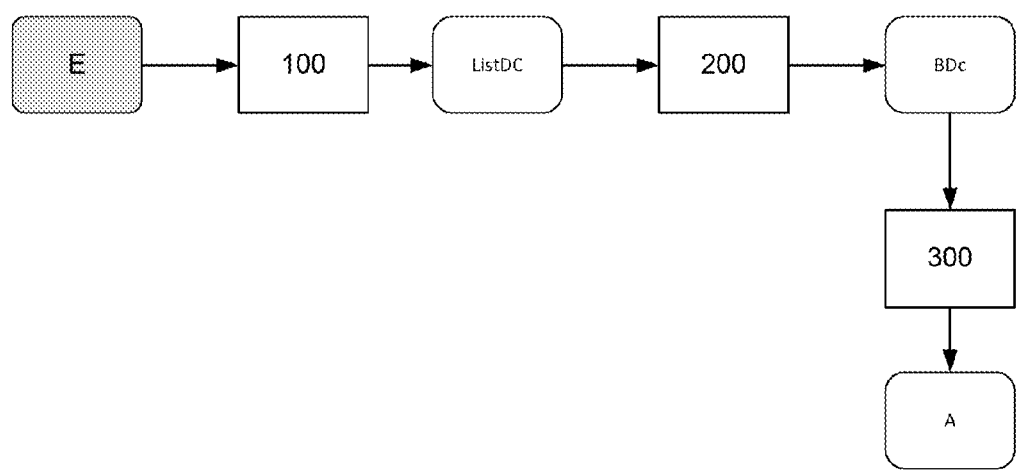
Figure 3:
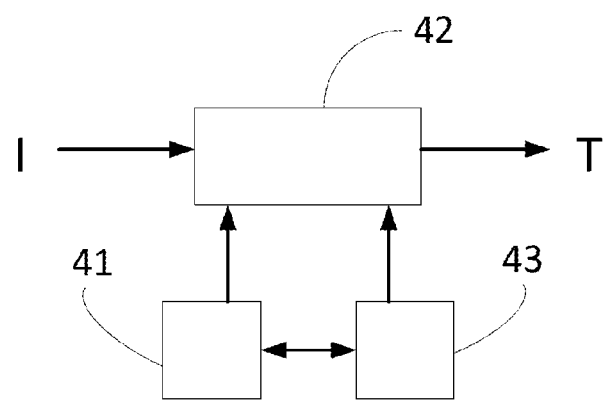

Other features and advantages of the invention shall appear more clearly from the following description of a preferred embodiment given by way of a simple, illustratory and non-exhaustive example and from the appended drawings, of which:

FIG. 1 is a block diagram of the proposed technique;

FIG. 2 describes the different phases of implementation of the proposed technique;

FIG. 3 describes an architecture for implementing the proposed technique.

5. DESCRIPTION 5.1. Reminder of the General Principle of the Invention

As explained here above, the proposed technique is based on a creation and an injection, into the processing circuit, of data for surveillance bank cards specifically prepared for use for purposes of tracking. More particularly, the proposed invention relies on the tracking of transactions carried out by means of said bank-card data.

The proposed technique provides means for a bank-card issuer to place the e-commerce sites under active surveillance and detect whether a theft, an infringement of security rules or any other fraudulent behavior has occurred.

Besides, this surveillance can be carried out without approaching the administrators of the sites or platforms of services under surveillance or under watch. The proposed technique can also be used to verify and infiltrate fraudulent sites. More particularly, the proposed technique can be used to trace the location of fraudulent operations when these operations occur.

To this end, the proposed technique, described with reference to FIG. 1, takes the form of a system (SysT) for processing data for surveillance bank cards. Such a system comprises, firstly, a module for introducing data for surveillance bank cards (MI). This module (MI) is in charge of inserting data for surveillance bank cards in various platforms for payment by bank card (PFP) (such as merchant websites). It inputs a list of data for surveillance bank cards to be inserted (ListDC). This list (ListDC) comprises records of data for surveillance bank cards. Each record (EnrI) comprises at least one bank card number (for example a number up to 16 digits) and a date of expiry in the year/month (YY/MM) format. For more precise tracking techniques, the record can also include a ceiling on the amount of unit transaction and an overall ceiling for this bank-card data.

The pieces of bank-card data of the list (ListDC) inserted into a website are saved in a tracking database (BDD). Such a system also comprises a surveillance module (MS). This module makes it possible to track the activity of the previously introduced data for surveillance bank cards. It is interfaced with the tracking database (BDD) comprising bank data inserted by the introduction module. It is in charge of accepting or rejecting the use of the bank cards. It is also in charge of recording, within the lists and tables of this database (BDD), successive uses of the data of bank cards, in the form of tracking record (EnrSuiv). A tracking record (EnrSuiv) comprises for example a date of use of the card, a business identifier or website identifier at which the data has been used, a transaction amount, an IP address of the website at which the data has been used and/or a physical address of a business at which the data has been used. The surveillance module (MS) is interfaced by means of a pre-defined interface (Ipd2) with at least one server of a payment services provider (FSP) (a bank transaction server for example) to receive, from this provider, data on the transactions using bank cards. According to a first possibility, the surveillance module MS is interposed with the FSP server and "sees" all the transactions that use bank-card data. According to a second embodiment, the surveillance module receives only transactions on bank-card data inserted into the platform for payment by bank card (PFP). This second possibility is simpler to implement. However, it requires the communicating of the list of data inserted into the FSP server. In one particular embodiment, the surveillance module (MS) is directly integrated into the FSP server. The surveillance module (MS) includes a control module (MC) for the use of the bank data. This control module (MC) comprises:

means of comparison, with data obtained by means of the transaction server FSP, of the bank card numbers of the tracking database (BDD); and means for verifying an authorization of payment when the means of comparison give a number recorded in the tracking database.

The system furthermore comprises an analysis module (MIA). This analysis module comprises a sub-module for identifying commerce sites in which data theft has been recorded (SMIS) and a correlation sub-module (SMC). This correlation sub-module combines the uses of different pieces of bank-card data that are listed in the tracking records in order to determine an origin of use and a pattern of use or theft.

5.2. Description of One Embodiment

In this embodiment, described with reference to FIG. 2, the proposed technique takes the form of the creation of a set of pieces of real and usable data for surveillance bank cards, available in the list ListDC. The issuer generates (100) a set of data pertaining to bank cards. The issuer sees to it that these bank-card numbers are random numbers so that they cannot be distinguished as being part of a set of data for surveillance bank cards. These card numbers are real but they are associated with specific bank accounts used for surveillance and for a system (SysT) for processing data for surveillance bank cards as described here above.

These pieces of bank card data are then injected (200) into e-commerce databases (BDc) (such as merchant websites) by the insertion module. This can be done by one of the following two methods, using two different predefined interfaces for the insertion of data:

an issuer can inject the card numbers into an electronic commerce site and place this site under surveillance or under watch with or without this site's knowing that it is under surveillance or under watch (the insertion is done through the purchase of goods or the provision of services);

an issuer can provide a service to an e-commerce site in giving it bank numbers that can be used for the surveillance (the insertion is done without the purchase of goods or the provision of services); the site under surveillance or under watch cooperates with the surveillance.

In the former case, the cards are used to make purchases in online stores which are under surveillance or under watch. This is done by using the APIs (application programming interfaces) or web interfaces of the sites that are under surveillance or under watch.

In the latter case, a merchant's site receives a list of payment data to be inserted and this list is injected into the database of the e-commerce site itself.

An alert (A) is created (300) in the issuer's system by means of the surveillance module (MS). This alert is triggered by any subsequent use of this card data. If an alert is triggered, then steps can be taken first of all to identify a breach in the electronic commerce site and secondly to warn the competent authorities. The e-commerce site concerned can then be notified and the manner in which the infringement has occurred can then be investigated.

5.3. Description of a Second Embodiment

In this embodiment, the proposed technique takes the form of the creation of a set of fictitious data for surveillance bank cards. In this embodiment, the numbers generated cannot be used to make transactions; these numbers are thus rejected by the credit institution or by the issuing organization depending on the transaction validating architecture used.

The advantage of this embodiment is that it makes it possible to detect an "attempt" to use a card without the need to make available funds (real goods) serving to detect fraudulent activity.

To enable the injection of these fictitious numbers into the information system of an online commerce site, two different methods can be used. In the first method, this data is directly inserted into the database of the online commerce site. This however requires that the administrators and the managers of this online commerce site should cooperate to carry out this insertion. On the one hand it is not certain that the administrators and the managers will agree to this approach and, on the other hand, this method makes it an obligation to furnish this data to third parties (the administrators and the managers) who could be implicated in the theft of this data.

In another more discreet method, a request is made for the cooperation of the credit institution with which the bank-card data is recorded. Indeed, a "bank code" is routinely included among the pieces of data of a bank card. This bank code designates the credit institution (or payment institution) that is the owner of the card. The idea is to inform the institution in question that the pieces of fictitious bank-card data are associated with it and to request this institution for temporary authorization with respect to these pieces of fictitious data. Thus, the fictitious data can be injected into the system by means of orders for goods and services. To avoid having to spend excessively large sums of money with the merchants under surveillance or under watch, these orders for goods and services can be routinely cancelled after they are made: thus, the data is present in the system without any need to spend money.

5.4. Description of a Case of Use

In this case of use, a robotic system that is entrusted with the data for surveillance bank cards on the one hand and the electronic commerce sites on the other hand, distributes data for surveillance bank cards to these electronic commerce sites. In this case of use, the pieces of bank-card data are distributed linearly between the sites to be put under surveillance or under watch (there is no probabilistic implementation). The system uses pre-programmed actions to make a search, on each site to be put under surveillance or under watch, for one or more articles of a value lower than the predetermined amount. This is done by pre-programming a certain number of actions in a man/machine interface-handling automaton. Naturally, this can also be done by hand, by a data entry operator. The main characteristic of this distribution is that a given bank-card number is used only once for a given website.

The robotic system (or data entry operator) inserts the following into a tracking database: pieces of bank data, the date on which they have been used, the website on which they have been used and the supplies purchased. The pieces of inserted bank data are then eliminated from the list of bank data available for insertion.

Working continuously, in being linked or not linked with a payment file of the banking institutions, the system identifies the fraudulently used pieces of bank data among the bank data of the tracking database. When a purchase is identified with pieces of bank data coming from the tracking database, the system creates a list of operations made with these pieces of bank-card data. The operations are identified by their date and time, the name of the business with which the operations are made (physical business entity, online business entity). The pieces of data that are also saved are the amount of the transaction, the business entity's transaction reference and the country in which the business entity is located (when this piece of data is accessible). When this piece of data is not accessible, there is an additional step for making a search, in one or more databases, for the domain name associated with the merchant with whom the fraudulent action has been performed in order to identify the owner of the domain name associated with the merchant and associate a country with this domain name. When the pieces of bank data are not used with an online merchant, the additional search step is carried out among names of business firms.

In this case of use, when one number in the list of numbers under surveillance has been used, then:
either the pieces of bank-card data are invalidated and will therefore no longer be usable;
or the pieces of bank-card data are not invalidated: these pieces of data come under reinforced surveillance with a routine request for authorization being made before payment. A surveillance of the use is initiated. The list of operations assigned to this data is supplemented.

Thus, taking the second assumption, when a request for authorization before payment is requested, the system:
receives the request for authorization;
requests, when possible, additional data on the device used to carry out the transaction (IP address for example);
ascertains that the amount of the transaction does not exceed the predetermined surveillance ceiling (this ceiling is different from the usual bank-card ceiling, it is a ceiling specific to the present technique, lower than the "bank-card" ceiling and enables the organization not to "lose" too much money with the system in question;
rejects the transaction when the amount exceeds this surveillance ceiling but records the transactional data received; the transaction is marked as being rejected in the list of transactions;
accepts payment when the amount does not exceed this ceiling, and records the transactional data received.

In a complementary manner, when a total outstanding amount is reached on a card under surveillance, the data of the card is invalidated.

The system also continuously carries out an analysis of the tracking data. The purpose of this analysis is, on the one hand, to identify the online business site or sites that have been subjected to a theft of banking data. Through the technique of the invention, this is a simple operation since it entails verifying the number of operations performed in each tracking list associated with the banking data and then identifying the website in which this data has been used. The website in question can be alerted as soon as the second use is identified so that it takes security steps as soon as possible.

When the card data is not immediately invalidated, subsequent to the second use of these cards, the system implements an analysis module in which the transactions are time-stamped and, as far as possible, localized (using especially the IP address of the transaction sender). This module delivers a map of use of the bank-card data.

5.5. Other Features and Advantages

Referring to FIG. 3, a simplified architecture is presented of a data-processing system for processing data for surveillance bank cards, capable of implementing the technique described. Such a terminal comprises a memory 41, a central processing unit 42 equipped for example with a microprocessor and driven by the computer program 43 implementing at least one part of the method as described. In at least one embodiment, the described technique is implemented in the form of a software application. In another embodiment, the described technique is implemented in purely hardware form, using processors and interfaces specially created for this purpose. Such a system comprises:
means for introducing data for surveillance bank cards into a platform for payment by bank card, said module saving, in a database called a tracking database, the bank-card data inserted into said platform for payment by bank card;
a module for surveillance of the activity of the data for surveillance bank cards previously introduced into said platform for payment by bank card, said module saving, in said tracking database, at least one record of tracking the use of the bank-card data.

These means are driven by the microprocessor using the program loaded into the memory of the terminal. Depending on the embodiments, the system also comprises other means used to carry out exchanges with one or more bank servers such as means for blocking bank-card data.

The invention claimed is:

1. A bank cards fraud detection system, the system configured to detect fraudulent behaviors associated with e-commerce websites on bank cards, wherein the system comprises:
a non-transitory computer-readable medium comprising a tracking database stored thereon;
at least one processor configured by computer-readable instructions to implement:
an introducing module configured to introduce data for surveillance bank cards into a platform for payment by a bank card, through purchase of goods or provision of services on a given e-commerce website, the platform for payment being a part of the given e-commerce website, said introducing module being configured to save the data for surveillance bank cards inserted into said platform for payment by said bank card, to the tracking database;
a surveillance module configured to place under surveillance activity of the data for surveillance bank cards previously introduced into said platform of the given e-commerce website, said surveillance module being configured to save, to said tracking database, a plurality of records of tracking of the use of the data for surveillance bank cards and delivering data on detection of a fraudulent use of said data for surveillance bank cards, each record of tracking comprising an identifier of the given e-commerce website, an IP address of an e-commerce website at which the data is used, and a timestamp corresponding to the time the data is used;
an analysis module configured to use the IP address and the timestamp of each record of tracking to map use of the data for surveillance bank cards; and
a pre-defined connection interface of the surveillance module to at least one transaction server of a payment service provider, wherein the surveillance module is further configured to control use of bank-card data obtained by the system from the at least one transaction server through the predefined connection interface, and wherein the surveillance bank cards are associated with specific bank accounts generated exclusively for use for purposes of fraud detection.

2. The system according to claim 1, wherein the introducing module inputs a list of data for surveillance bank cards to be inserted, said list comprising records of data for surveillance bank cards, each record of said list comprising at least one bank card number and a date of expiry in a year/month format.

3. The system according to claim 2, wherein each record of said list further comprises a ceiling on an amount of a unit transaction and an overall ceiling.

4. The system according to claim 1, wherein said pre-defined connection interface is configured to connect to a bank-card data base of said platform for payment by a bank card of the payment service provider.

5. The system according to claim 1, wherein said surveillance module comprises the following elements controlling use of bank-card data:
 means for comparing, with said data obtained from said at least one transaction server of a payment service provider, a bank card number of said tracking data base; and
 means for verifying an authorization of payment when the means for comparing provide a number recorded in said tracking data base.

6. The system according to claim 5, wherein said means for verifying further comprise means for obtaining at least one piece of complementary data associated with the use of said bank cards.

7. The system according to claim 6, wherein said piece of complementary data belongs to the group consisting of:
 an IP address for sending a transaction relative to said bank data;
 a physical address corresponding to a place of use of said bank data.

8. A method for detecting fraudulent behaviors associated with e-commerce websites on bank cards, comprising:
 processing data for surveillance bank cards, comprising the following acts performed by a processing system:
 introducing data for surveillance bank cards into a platform for payment by a bank card, through a purchase of goods or a provision of services on a given e-commerce website, the platform for payment being a part of the given e-commerce website, said introducing comprising saving, to a data base stored in a non-transitory computer-readable medium, called a tracking data base, of the bank-card data inserted into said platform for payment by a bank card;
 tracking activity of the data for surveillance bank cards, previously introduced into said platform of the given e-commerce website, comprising saving, to said tracking data base, a plurality of records of tracking of a use of bank-card data, each record of said records of tracking comprising an identifier of the given e-commerce website, an IP address of an e-commerce website at which the data is used, and a timestamp corresponding to the time the data is used; and
 using the IP address and the timestamp of each record of tracking to map use of the data for surveillance bank cards,
 wherein said tracking comprises connecting to at least one transaction server of a payment service provider through a pre-defined connection interface and controlling use of bank-card data obtained by the processing system from the at least one transaction server through the pre-defined connection interface, and wherein the surveillance bank cards are associated with specific bank accounts generated exclusively for use for purposes of fraud detection.

9. A non-transitory computer-readable medium comprising a computer program product stored thereon and comprising program code instructions executable on a computer of a processing system such that the following acts are performed by the processing system:
 processing data for surveillance bank cards, comprising:
 introducing data for surveillance bank cards into a platform for payment by a bank card, through a purchase of goods or a provision of services on a given e-commerce website, the platform for payment being a part of the given e-commerce website, said introducing comprising saving, to a data base stored in a non-transitory computer-readable medium, called a tracking data base, of the bank-card data inserted into said platform for payment by a bank card;
 tracking activity of the data for surveillance bank cards, previously introduced into said platform of the given e-commerce website, comprising saving, to said tracking data base, a plurality of records of tracking of a use of bank-card data, each record of said records of tracking comprising an identifier of the given e-commerce site, an IP address of an e-commerce website at which the data is used, and a timestamp corresponding to the time the data is used; and
 using the IP address and the timestamp of each record of tracking to map use of the data for surveillance bank cards,
 wherein said tracking comprises connecting to at least one transaction server of a payment service provider through a pre-defined connection interface and controlling use of bank-card data obtained by the processing system from the at least one transaction server through the pre-defined connection interface, and wherein the surveillance bank cards are specifically prepared for use for purposes of fraud detection.

10. A system configured to detect fraudulent behaviors associated with e-commerce websites on bank cards, wherein the system comprises:
 a non-transitory computer-readable medium comprising a tracking data base stored thereon; and
 a hardware component configured to:
 introduce data for surveillance bank cards into a platform for payment by a bank card, through purchase of goods or provision of services on an e-commerce website, the platform for payment being a part of the given e-commerce site;
 save the data for surveillance bank cards inserted into said platform for payment by a bank card, to the tracking data base;
 place under surveillance activity of the data for surveillance bank cards previously introduced into said platform of the given e-commerce website;
 save, to said tracking data base, a plurality of records of tracking of the use of the data for surveillance bank cards and delivering data on detection of a fraudulent use of said data for surveillance bank cards, each record of said records of tracking comprising an identifier of the given e-commerce site, an IP address of a website at which the data is used, and a timestamp corresponding to the time the data is used; and use the IP address and the timestamp of each record of tracking to map use of the data for surveillance bank cards, wherein said hardware component comprises a predefined connection interface to at least one transaction server of a payment service provider, and is configured to control use of bank-card data using data obtained by the system from the at least one transaction server through the predefined connection interface, and wherein the surveillance bank cards are associated with specific bank accounts generated exclusively for use for purposes of fraud detection.

\* \* \* \* \*